(12) United States Patent
Pu et al.

(10) Patent No.: US 12,556,955 B2
(45) Date of Patent: Feb. 17, 2026

(54) MEASUREMENT INDICATION METHOD, TERMINAL, AND NETWORK-SIDE DEVICE

(71) Applicant: VIVO MOBILE COMMUNICATION CO., LTD., Guangdong (CN)

(72) Inventors: Wenjuan Pu, Dongguan (CN); Xiaodong Yang, Dongguan (CN); Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 498 days.

(21) Appl. No.: 18/145,421

(22) Filed: Dec. 22, 2022

(65) Prior Publication Data
US 2023/0126936 A1 Apr. 27, 2023

Related U.S. Application Data

(63) Continuation of application No. PCT/CN2021/100609, filed on Jun. 17, 2021.

(30) Foreign Application Priority Data

Jun. 24, 2020 (CN) .......................... 202010589457.6

(51) Int. Cl.
H04W 24/10 (2009.01)
(52) U.S. Cl.
CPC .................................. *H04W 24/10* (2013.01)
(58) Field of Classification Search
CPC .............................. H04L 12/28; H04L 12/50
See application file for complete search history.

(56) References Cited

U.S. PATENT DOCUMENTS

| 11,234,244 | B2 | 1/2022 | Kung et al. |
| 2017/0374574 | A1 | 12/2017 | Lee et al. |
| 2019/0014553 | A1 | 1/2019 | Feng et al. |
| 2019/0037425 | A1 | 1/2019 | Hong et al. |
| 2019/0059105 | A1 | 2/2019 | Harada et al. |

(Continued)

FOREIGN PATENT DOCUMENTS

| CN | 110035447 A | 7/2019 |
| CN | 110691418 A | 1/2020 |

(Continued)

OTHER PUBLICATIONS

Extended European Search Report regarding European Patent Application No. 21829781.0, dated Oct. 31, 2023.

(Continued)

*Primary Examiner* — Dang T Ton
(74) *Attorney, Agent, or Firm* — Harness, Dickey & Pierce, P.L.C.

(57) ABSTRACT

A measurement indication method includes: obtaining at least one of first information, second information, or third information. The first information is related to a granularity of the terminal performing a non-connected state measurement; the second information is related to a granularity of the terminal reporting validity of a non-connected state measurement result; the third information is related to a granularity of the terminal reporting the non-connected state measurement result; and the granularity is related to at least one of a reference signal, a measurement quantity, or a frequency banks.

20 Claims, 4 Drawing Sheets

300

Transmit at least one of a first network indication message, a second network indication message, and a third network indication message; where the first network indication message is related to a granularity of a terminal performing a non-connected state measurement; the second network indication message is related to a granularity of the terminal reporting validity of a non-connected state measurement result; the third network indication message is related to a granularity of the terminal reporting the non-connected state measurement result; and the granularity is related to at least one of a reference signal, a measurement quantity, and a frequency band ~ S302

(56) References Cited

U.S. PATENT DOCUMENTS

| | | |
|---|---|---|
| 2019/0074887 A1 | 3/2019 | Yiu et al. |
| 2019/0313271 A1 | 10/2019 | Yiu |
| 2019/0327115 A1 | 10/2019 | Zhang et al. |
| 2021/0076245 A1 | 3/2021 | Zheng et al. |
| 2021/0219154 A1 | 7/2021 | Han et al. |
| 2023/0096151 A1* | 3/2023 | Karantonis ........ A61N 1/36139 607/59 |

FOREIGN PATENT DOCUMENTS

| | | |
|---|---|---|
| CN | 110913422 A | 3/2020 |
| JP | 2017063326 A | 3/2017 |
| JP | 2018532289 A | 11/2018 |
| WO | 2017075918 A1 | 5/2017 |
| WO | WO-2019218996 A1 | 11/2019 |
| WO | WO-2020057518 A1 | 3/2020 |
| WO | 2020108551 A1 | 6/2020 |

OTHER PUBLICATIONS

First Office Action regarding Japanese Patent Application No. 2022-577425, dated Nov. 24, 2023. Translation provided by Bohui Intellectual Property.
International Search Report and Written Opinion of the International Searching Authority regarding International Patent Application No. PCT/CN2021/100609, dated Sep. 23, 2021. Translation provided by Bohui Intellectual Property.
Second Office Action regarding Japanese Patent Application No. 2022-577425, dated May 23, 2024.
Second Office Action regarding European Patent Application No. 21829871.0, dated Oct. 23, 2025.

* cited by examiner

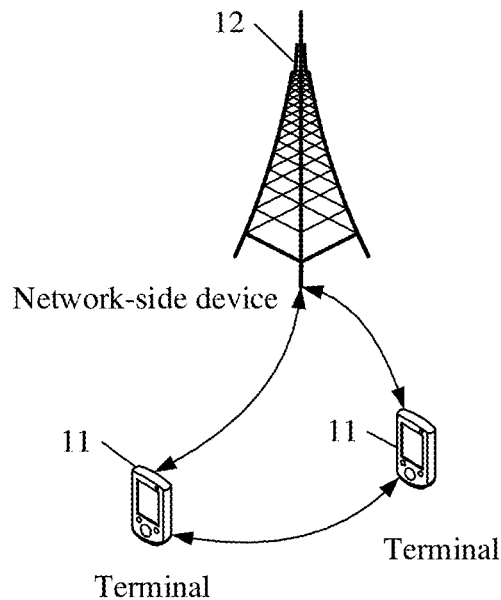

Obtain at least one of first information, second information, and third information; where the first information is related to a granularity of a terminal performing a non-connected state measurement; the second information is related to a granularity of the terminal reporting validity of a non-connected state measurement result; the third information is related to a granularity of the terminal reporting the non-connected state measurement result; and the granularity is related to at least one of a reference signal, a measurement quantity, and a frequency band ~ S202

Transmit at least one of a first network indication message, a second network indication message, and a third network indication message; where the first network indication message is related to a granularity of a terminal performing a non-connected state measurement; the second network indication message is related to a granularity of the terminal reporting validity of a non-connected state measurement result; the third network indication message is related to a granularity of the terminal reporting the non-connected state measurement result; and the granularity is related to at least one of a reference signal, a measurement quantity, and a frequency band  ~ S302

FIG. 3

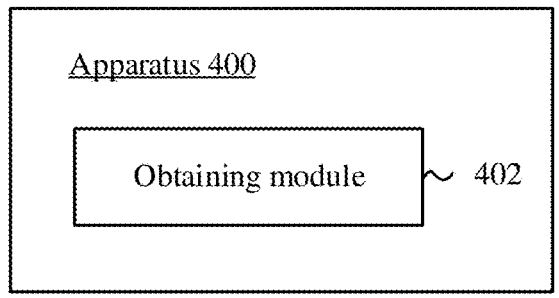

FIG. 4

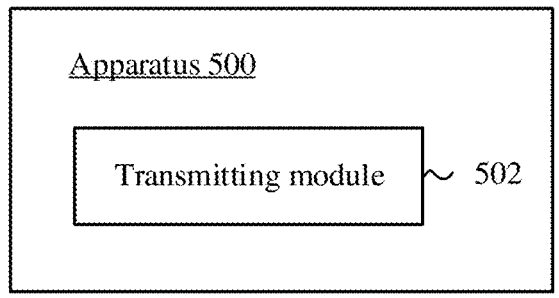

FIG. 5

MEASUREMENT INDICATION METHOD, TERMINAL, AND NETWORK-SIDE DEVICE

CROSS-REFERENCE TO RELATED APPLICATIONS

This application is a Bypass Continuation Application of PCT/CN2021/100609 filed on Jun. 17, 2021, which claims priority to Chinese Patent Application No. 202010589457.6 filed on Jun. 24, 2020, which are incorporated herein by reference in their entirety.

TECHNICAL FIELD

This application relates to the technical field of communications, and specifically, to a measurement indication method, a terminal, and a network-side device.

BACKGROUND

A network-side device can instruct a terminal in a non-connected state (including an idle state and an inactive state) to perform a measurement, and validity of a measurement result is reported after the terminal enters a connected state. When the network-side device requires the terminal to report the measurement result, the terminal reports the measurement result. In the above way, the network-side device can quickly configure or activate a secondary cell (Scell) for the terminal according to the measurement result reported by the terminal, thereby quickly restoring terminal data.

SUMMARY

According to a first aspect, provided is a measurement indication method, applied to a terminal. The method includes: obtaining at least one of first information, second information, or third information; where the first information is related to a granularity of the terminal performing a non-connected state measurement; the second information is related to a granularity of the terminal reporting validity of a non-connected state measurement result; the third information is related to a granularity of the terminal reporting the non-connected state measurement result; and the granularity is related to at least one of a reference signal, a measurement quantity, or a frequency band.

According to a second aspect, provided is a measurement indication method, applied to a network-side device. The method includes: transmitting at least one of a first network indication message, a second network indication message, or a third network indication message; where the first network indication message is related to a granularity of a terminal performing a non-connected state measurement; the second network indication message is related to a granularity of the terminal reporting validity of a non-connected state measurement result; the third network indication message is related to a granularity of the terminal reporting the non-connected state measurement result; and the granularity is related to at least one of a reference signal, a measurement quantity, or a frequency band.

According to a third aspect, provided is a measurement indication apparatus, including: an obtaining module, configured to obtain at least one of first information, second information, or third information; where the first information is related to a granularity of the terminal performing a non-connected state measurement; the second information is related to a granularity of the terminal reporting validity of a non-connected state measurement result; the third information is related to a granularity of the terminal reporting the non-connected state measurement result; and the granularity is related to at least one of a reference signal, a measurement quantity, or a frequency band.

According to a fourth aspect, provided is a measurement indication apparatus, including: a transmitting module, configured to transmit at least one of a first network indication message, a second network indication message, or a third network indication message; where the first network indication message is related to a granularity of a terminal performing a non-connected state measurement; the second network indication message is related to a granularity of the terminal reporting validity of a non-connected state measurement result; the third network indication message is related to a granularity of the terminal reporting the non-connected state measurement result; and the granularity is related to at least one of a reference signal, a measurement quantity, or a frequency band.

According to a fifth aspect, provided is a terminal. The terminal includes a processor, a memory, and a program or instruction that is stored in the memory and executable on the processor, where when the program or instruction is executed by the processor, the method according to the first aspect is implemented.

According to a sixth aspect, provided is a network-side device. The network-side device includes a processor, a memory, and a program or instruction that is stored in the memory and executable on the processor, where when the program or instruction is executed by the processor, the method according to the second aspect is implemented.

According to a seventh aspect, provided is a non-transitory readable storage medium having a program or instruction stored thereon, where when the program or instruction is executed by a processor, the method according to the first aspect is implemented or the method according to the second aspect is implemented.

According to an eighth aspect, provided is a chip. The chip includes a processor and a communication interface, where the communication interface is coupled to the processor, and the processor is configured to run a program or instruction to implement the method according to the first aspect or to implement the method according to the second aspect.

BRIEF DESCRIPTION OF THE DRAWINGS

FIG. 1 is a block diagram of a wireless communication system according to one embodiment of this application;

FIG. 2 is a schematic flowchart of a measurement indication method according to one embodiment of this application;

FIG. 3 is a schematic flowchart of a measurement indication method according to another embodiment of this application;

FIG. 4 is a schematic structural diagram of a measurement indication apparatus according to one embodiment of this application;

FIG. 5 is a schematic structural diagram of a measurement indication apparatus according to another embodiment of this application;

DETAILED DESCRIPTION

Figure 6:
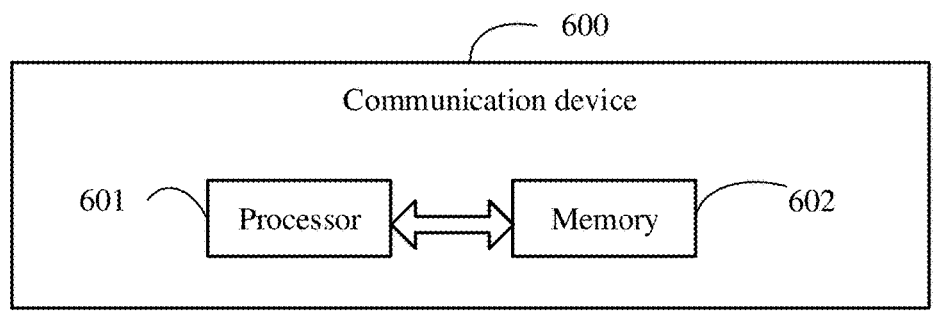
FIG. 6 is a schematic structural diagram of a communication device according to one embodiment of this application.

The technical solutions in embodiments of this application are clearly described below with reference to the accompanying drawings in the embodiments of this application. Apparently, the described embodiments are some of the embodiments of this application, but not all the embodiments. Based on the embodiments of this application, all other embodiments obtained by a person of ordinary skill in the art shall fall within the scope of protection of this application.

The terms "first", "second", etc. in the description and claims of this application are used for distinguishing similar objects, rather than describing specified sequences or orders. It should be understood that data used in this way may be interchanged in a proper situation, so that the embodiments of this application can be implemented in sequences other than those illustrated or described here, the objects distinguished by "first" and "second" are usually of the same kind, and the number of objects is do not defined, for example, there may be one or more first objects. In addition, "and/or" in the description and claims represents at least one of connected objects, and the character "/" generally indicates that associated objects is an "or" relationship.

It is worth pointing out that the techniques described in the embodiments of this application are not limited to long term evolution (LTE)/LTE-advanced (LTE-A) systems, and may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, the described techniques may be used for the systems and radio technologies mentioned above, and may also be used for other systems and radio technologies. However, the following describes a new radio (NR) system for exemplary purposes, and an NR term is used in most of the following descriptions, although these techniques may also be applied to applications other than NR system applications, such as a 6th generation (6G) communication system.

Currently, a measurement configuration transmitted by the network-side device to the terminal is based on a measurement of a synchronization signal and physical broadcast channel block (SSB), and the terminal in the non-connected state can perform an SSB measurement according to the measurement configuration. Version 17 (R17) may allow the terminal to transmit a measurement configuration based on a channel state information-reference signal (CSI-RS), so that the terminal in the non-connected state can also perform a CSI-RS measurement.

The type of a reference signal has been increased, but there is no regulation on how the terminal reports the measurement of the reference signal, which may lead to a waste of network resources. For example, the terminal has a valid CSI-RS measurement result, and reports a validity indication of the measurement result to the network-side device, where the validity indication is used for identifying there is a valid measurement result available on the terminal. Since the network-side device cannot determine whether the CSI-RS measurement result is valid or an SSB measurement result is valid according to the validity indication, if the network-side device expects to obtain the SSB measurement result, in this case, the network-side device requests the terminal to report the measurement result; however, the terminal reports the CSI-RS measurement result that the network-side device does not care about, thereby leading to a waste of network resources.

FIG. 1 shows a block diagram of a wireless communication system which may be applied in embodiments of this application. The wireless communication system includes a terminal 11 and a network-side device 12. The terminal 11 may also be referred to as a terminal device or a user equipment (UE), the terminal 11 may be a terminal-side device such as a mobile phone, a tablet personal computer, a laptop computer or a notebook computer, a personal digital assistant (PDA), a palm computer, a netbook, an ultra-mobile personal computer (UMPC), a mobile Internet Device (MID), a wearable device or a vehicle user equipment (VUE), and a pedestrian user equipment (PUE), and the wearable device includes: a wristband, earphones, glasses, etc. It should be noted that the embodiments of this application do not define the specific type of the terminal 11. The network-side device 12 may be a base station or a core network, where the base station may be referred to as a node B, an evolution node B, an access point, a base transceiver station (BTS), a radio base station, a radio transceiver, a basic service set (BSS), an extended service set (ESS), a node B, an evolved node B (eNB), a next generation node B (gNB), a home B node, a home evolved node B, a WLAN access point, a WiFi node, a transmitting receiving point (TRP), or a certain other suitable term in the field, and as long as the same technical effect is achieved, the base station is not limited to a specified technical term. It should be noted that in the embodiments of this application, only the base station in an NR system is taken as an example, but the specific type of the base station is not defined.

With reference to the accompanying drawings, the measurement indication method, the terminal, and the network-side device provided by the embodiments of this application are described in detail below through specific embodiments and application scenarios.

As shown in FIG. 2, one embodiment of this application provides a measurement indication method 200. The method 200 may be performed by a terminal. In other words, the method 200 may be performed by software or hardware installed in the terminal. The method includes the following steps.

At S202, at least one of first information, second information, or third information is obtained; where the first information is related to a granularity of the terminal performing a non-connected state measurement; the second information is related to a granularity of the terminal reporting validity of a non-connected state measurement result; the third information is related to a granularity of the terminal reporting the non-connected state measurement result; and the granularity is related to at least one of a reference signal, a measurement quantity, or a frequency band.

The granularity mentioned in the embodiments of this application may be used for representing the degree of detail of related information, the degree of subdivision or the size of the amount of information included in a basic unit of a protocol, and so on. The related information may be information related to the reference signal, the measurement quantity, the frequency band, etc. For example, the terminal reports the validity of the measurement result of the reference signal at a certain granularity, where the granularity may be: 1) the terminal reports a valid measurement result, but it is not indicated that the reference signal of which measurement result is valid; 2) the terminal reports a valid measurement result, and it is indicated or by default both SSB and CSI-RS measurement results are valid; 3) is the measurement result of an SSB reference signal reported by the terminal valid and is the reported CSI-RS measurement result valid; and 4) the terminal reports only the measurement result of which reference signal is valid.

The granularity mentioned in the first information, the second information, and the third information is related to at least one of the reference signal, the measurement quantity, or the frequency band, for example, the granularity mentioned in the first information is related to the reference signal, the measurement quantity, and the frequency band, the granularity mentioned in the first information is related to the reference signal, the granularity mentioned in the first information is related to the measurement quantity, the granularity mentioned in the first information is related to the frequency band, the granularity mentioned in the first information is related to the reference signal and the frequency band, and so on. Similarly, the granularity mentioned in the second information is related to at least one of the reference signal, the measurement quantity, or the frequency band; and the granularity mentioned in the third information is related to at least one of the reference signal, the measurement quantity, or the frequency band.

The granularity includes the granularity of the reference signal, the granularity of the measurement quantity, the granularity of the frequency band, or the like.

In one example, the reference signal includes a first type and a second type, the first type includes a channel state information-reference signal (CSI-RS), and the second type includes a synchronization signal and physical broadcast channel block (SSB).

In another example, the measurement quantity includes a first type and a second type, the first type includes a received signal strength indication (RSSI), and the second type includes a channel occupancy ratio (COR).

In still another example, the frequency band includes a first type and a second type, the first type includes a licensed frequency band, and the second type includes an unlicensed frequency band.

It should be noted that in the embodiments below, in a case that the first type and the second type appear simultaneously, for example, the first information appearing below instructs the terminal to perform measurements based on "the first type and the second type", "the first type" and "the second type" appearing simultaneously usually refer to the first type and second type listed in any one of the above three examples. For example, in a case that the first type is a CSI-RS, the second type usually refers to an SSB, usually not a COR and an unlicensed frequency band. In other words, in the embodiments below, when the first type belongs to a certain dimension, the second type corresponding thereto in a same context also belongs to the dimension, where the dimension may be a reference signal, a measurement quantity, or a frequency band.

The first information mentioned in the embodiment is related to the granularity of the terminal performing the non-connected state measurement, for example, the first information is used for indicating whether the terminal performs a CSI-RS measurement in the non-connected state and whether to perform an SSB measurement; for another example, the first information is used for indicating whether the terminal performs an RSSI measurement in the non-connected state and whether to perform a COR measurement; and for still another example, the first information is used for indicating whether the terminal performs a licensed frequency band measurement in the non-connected state and whether to perform an unlicensed frequency band measurement.

The second information mentioned in the embodiment is related to the granularity of the terminal reporting the validity of the non-connected state measurement result, for example, the second information is used for instructing the terminal to report the validity of the non-connected state measurement result under a first condition, where the non-connected state measurement result may be a CSI-RS measurement result, an SSB measurement result, an RSSI measurement result, a COR measurement result, a licensed frequency band measurement result, an unlicensed frequency band measurement result, or the like. For a detailed introduction of the first condition, reference may be made to the embodiments below.

The third information mentioned in the embodiment is related to the granularity of the terminal reporting the non-connected state measurement result, for example, the third information is used for indicating in what situation the terminal reports (or whether to report, how to report, etc.) the CSI-RS measurement result, an SSB measurement result, an RSSI measurement result, a COR measurement result, a licensed frequency band measurement result, an unlicensed frequency band measurement result, or the like.

The first information, the second information, and the third information may be agreed by the protocol, and may also be obtained from downlink indication information transmitted by the network-side device. Thus, obtaining the first information mentioned in S202 may be obtaining the first information based on an agreement by the protocol or obtaining the first information from a received first network indication message (may also be referred to as a first downlink message); similarly, obtaining the second information may be obtaining the second information based on the agreement by the protocol or obtaining the second information from a received second network indication message (may also be referred to as a second downlink message); and obtaining the third information may be obtaining the third information based on the agreement by the protocol or obtaining the third information from a received third network indication message (may also be referred to as a third downlink message).

According to the measurement indication method provided by the embodiments of this application, a terminal may obtain at least one of first information, second information, or third information, where the first information is related to a granularity of the terminal performing a non-connected state measurement, the second information is related to a granularity of the terminal reporting validity of a non-connected state measurement result, the third information is related to a granularity of the terminal reporting the non-connected state measurement result, and the granularity mentioned above is related to at least one of a reference signal, a measurement quantity, or a frequency band, so that the terminal can perform non-connected state measurement reporting, etc. based on at least one of the first information, the second information, or the third information, thereby avoiding a transmission problem caused by information asymmetry between the terminal and a network-side device, avoiding a waste of network resources, and improving the validity of communications.

To describe in detail the first information, the second information, the third information, etc. mentioned above, a detailed description will be made with reference to a plurality of embodiments.

Embodiment I

The first information is related to the granularity of the terminal performing the non-connected state measurement, and the first information is used for indicating a behavior of the terminal, which includes one of the following:

1) performing measurements based on the first type and the second type, for example, the first information instructs the terminal to perform measurements based on the CSI-RS and the SSB, instructs the terminal to perform measurements based on the RSSI and the COR, and instructs the terminal to perform measurements based on a licensed frequency band and an unlicensed frequency band;
2) not performing the measurements based on the first type and the second type, for example, the first information instructs the terminal not to perform the measurements based on the CSI-RS and the SSB, instructs the terminal not to perform the measurements based on the RSSI and the COR, and instructs the terminal not to perform the measurements based on the licensed frequency band and the unlicensed frequency band;
3) performing the measurements based on at least one of the first type or the second type, for example, the first information instructs the terminal to perform a the measurements based on t least one of the CSI-RS or the SSB, instructs the terminal to perform the measurements based on at least one of the RSSI or the COR, and instructs the terminal to perform the measurements based on at least one of the licensed frequency band or the unlicensed frequency band; and
4) performing the measurements based on a certain one of the first type and the second type, for example, the first information instructs the terminal to perform the measurement based on the CSI-RS or the first information instructs the terminal to perform the measurement based on the SSB, for another example, the first information instructs the terminal to perform the measurement based on the RSSI or instructs the terminal to perform the measurement based on the COR, and for still another example, the first information instructs the terminal to perform the measurement based on the unlicensed frequency band or instructs the terminal to perform the measurement based on the licensed frequency band, etc.

It should be noted that the measurement mentioned in the embodiments of this application may refer to a non-connected state measurement, the non-connected state includes an idle state and an inactive state, and the non-connected state measurement may also be referred to as an early measurement or an idle/inactive measurement.

As stated above, the first information may be agreed by the protocol, and may also be obtained from the received first network indication message.

In a case that the first information is agreed by the protocol, for example, it is agreed by the protocol that the terminal performs the measurements based on the CSI-RS and the SSB in a process of cell selection or re-selection, and for another example, it is agreed by the protocol that the terminal is determined according to a received measurement configuration, for example, if CSI-RS measurement configuration information transmitted by a serving cell is received, the terminal performs the measurement based on the CSI-RS, and if SSB measurement configuration information transmitted by the serving cell is received, the terminal performs the measurement of the SSB. Similarly, the method agreed by the protocol is also applicable to the case that the first type and the second type are the RSSI and the COR, respectively, and is also applicable to the case that the first type and the second type are the licensed and unlicensed frequency bands, respectively.

In a case that the first information is obtained from the received first network indication message, the first network indication message may include a first indication field and a second indication field, or the first network indication message includes a third indication field.

The first indication field may be used for indicating whether the terminal performs the measurement based on the first type. The first type may be the CSI-RS, or the RSSI, or the licensed frequency band, or the like. For example, a value of the first indication field being 1 instructs the terminal to perform the measurement of the CSI-RS, and the value being 0 instructs the terminal not to perform the measurement of the CSI-RS.

The second indication field is used for indicating whether the terminal performs the measurement based on the second type. The second type may be the SSB, or the COR, or the unlicensed frequency band, or the like. For example, a value of the second indication field being 1 instructs to perform the measurement of the SSB, and the value being 0 instructs not to perform the measurement of the SSB.

The third indication field is used for instructing the terminal to perform at least one of: performing the measurements based on the first type and the second type; performing the measurements based on at least one of the first type or the second type; performing the measurements based on a certain one of the first type and the second type; and not performing the measurements based on the first type and the second type. The first type may be the CSI-RS, the RSSI, the licensed frequency band, or the like. Accordingly, the second type may be the SSB, the COR, the unlicensed frequency band, or the like.

The first network indication message mentioned in the embodiments of this application may be a broadcast message, and may also be dedicated signaling.

In one example, the third indication field includes at least one of the following:
  a first value (e.g., the first value is Both, two, a CSIRS-SSB, etc.), where the first value is used for instructing the terminal to perform the measurements based on the first type and the second type, or in a case that the third indication field is the first value, the terminal performs the measurements based on the first type and second type;
  a second value (e.g., the second value is Least, a CSIRS-or-SSB, etc.), where the second value is used for instructing the terminal to perform the measurements based on at least one of the first type and the second type, and in the example, in a case that the third indication field is the second value, the terminal performs the measurements based on at least one of the first type and second type;
  a third value, where the third value is used for instructing the terminal to perform the measurement based on the first type, and in the example, in a case that the third indication field is the third value, the terminal performs the measurement based on the first type, for example, the third value is a CSIRS, and the terminal performs the measurement based on the CSI-RS; or
  a fourth value, where the fourth value is used for instructing the terminal to perform the measurement based on the second type, where in the example, in a case that the third indication field is the fourth value, the terminal performs the measurement based on the second type, for example, the fourth value is the SSB, and the terminal performs the measurement based on the SSB.

In other examples, in a case that the third indication field does not appear in the first network indication message, the first network indication message may instruct the terminal not to perform the measurements based on the first type and the second type. When the third indication field is other specified values (values other than the first value, the second value, the third value, and the fourth value, e.g., null), the terminal is instructed not to perform the measurements based on the first type and the second type.

In other examples, when the third indication field is a certain specified value (e.g., 1), by default the terminal is instructed to perform one of: performing the measurements based on the first type and the second type, performing the measurements based on at least one of the first type or the second type, performing the measurements based on a certain one or a specified one of the first type and the second type (e.g., the first type); and when the third indication field is another specified value (e.g., 0), by default the measurements based on the first type and the second type are not performed, or the measurements based on a certain one of the first type and the second type (e.g., the second type) is performed.

In the example above, taking the reference signal as an example, the indication method of the value of the third indication field is introduced, and the method may also be applied to the measurement quantity and the frequency band.

In embodiment I, by means of the agreement by the protocol or the indication of the network-side device, the terminal may know whether to perform the measurement based on the first type and whether to perform the measurement based on the second type, thereby avoiding a transmission problem caused by information asymmetry between the terminal and the network-side device, avoiding a waste of network resources, and improving the validity of communications.

Embodiment II

The second information is related to the granularity of the terminal reporting the validity of the non-connected state measurement result, for example, the second information is used for instructing the terminal to report the validity of the measurement result in a case that the first condition is satisfied.

Optionally, the first condition includes one of the following:

1) At least one of the measurement result (of) the first type or the measurement result (of) the second type is valid. For example, the second information instructs the terminal to report the validity of the measurement result in the case that the CSI-RS measurement result and the SSB measurement result are valid, or only the CSI-RS measurement result is valid, or only the SSB measurement result is valid. For another example, the second information instructs the terminal to report the validity of the measurement result in the case that the RSSI measurement result and the COR measurement result are valid, or only the RSSI measurement result is valid, or only the COR measurement result is valid. Similarly, the indication method is also applicable to indicating reporting the validity of the measurement results of the licensed and unlicensed frequency bands.

2) Both the measurement result of the first type and the measurement result of the second type are valid. For example, the second information instructs the terminal to report the validity of the measurement result only when both the CSI-RS measurement result and the SSB measurement result are valid. Similarly, the indication method is also applicable to indicating the validity of the RSSI and COR measurement results, and is also applicable to indicating reporting the validity of the measurement results of the licensed and unlicensed frequency bands.

3) A certain one of the measurement result of the first type and the measurement result of the second type is valid. For example, the second information instructs the terminal to report the validity of the measurement result in the case that the CSI-RS measurement result is valid; or the second information instructs the terminal to report the validity of the measurement result in the case that the SSB measurement result is valid. Similarly, the indication method is also applicable to indicating the validity of the RSSI and COR measurement results, and is also applicable to indicating reporting the validity of the measurement results of the licensed and unlicensed frequency bands.

In a case that the first type is the CSI-RS and the second type is the SSB, the measurement result mentioned in the embodiments of this application is valid, for example, the terminal obtains the CSI-RS measurement result that satisfies a first preset requirement, or the terminal obtains the SSB measurement result that satisfies a second preset requirement, where the first preset requirement may be that the CSI-RS measurement result is higher than a first threshold; and the second preset requirement may be that the SSB measurement result is higher than a second threshold, where the first threshold may be equal or unequal to the second threshold.

In a case that the first type is the RSSI and the second type is the COR, the measurement result mentioned in the embodiments of this application is valid, for example, the terminal obtains the RSSI that satisfies a third preset requirement, or the terminal obtains the COR that satisfies a fourth preset requirement.

In a case that the first type is the licensed frequency band and the second type is the unlicensed frequency band, the measurement result mentioned in the embodiments of this application is valid, for example, the terminal obtains the measurement result that satisfies a fifth preset requirement based on the licensed frequency band, or the terminal obtains the measurement result that satisfies a sixth preset requirement based on the unlicensed frequency band.

As stated above, the second information may be agreed by the protocol, and may also be obtained from the received second network indication message.

In a case that the second information is agreed by the protocol, for example, it is agreed by the protocol that when at least one of the measurement result of the first type or the measurement result of the second type of the terminal is valid, it may be reported that the measurement result is valid. For another example, it is agreed by the protocol that when both the measurement results of the first type and the second type of the terminal are valid, it is reported that the measurement result is valid. As still another example, it is agreed by the protocol that the terminal reports the validity of the measurement result of a high-priority type (such as reporting the SSB measurement result).

In a case that the second information is obtained from the received second network indication message, the second network indication message includes a fourth indication field, and the fourth indication field includes at least one of the following:
- a fifth value (e.g., the fifth value is least, the CSIRS-or-SSB, etc.), where the fifth value is used for instructing the terminal to report the validity of the measurement result in the case that at least one of the measurement result of the first type or the measurement result of the second type is valid, and in the example, in a case that the fourth indication field is the fifth value, the terminal reports the validity of the measurement result in the case that at least one of the measurement result of the first type or the measurement result of the second type is valid;
- a sixth value (e.g., the sixth value is both, two, the CSIRS-SSB, etc.), where the sixth value is used for instructing the terminal to report the validity of the measurement results in the case that both the measurement result of the first type and the measurement result of the second type are valid, and the example in a case that the fourth indication field is the sixth, a seventh, and an eighth value is similar to the example where the fourth indication field is the fifth value, and therefore, details are not described again;
- the seventh value, where the seventh value is used for instructing the terminal to report the validity of the measurement result in the case that the measurement result of the first type is valid; or
- the eighth value, where the eighth value is used for instructing the terminal to report the validity of the measurement result in the case that the measurement result of the second type is valid.

The second network indication message mentioned in the embodiments of this application may be a broadcast message, and may also be dedicated signaling.

Optionally, the second information may also be implemented by reusing the first information or the first network indication message in Embodiment I, for example, the first network indication message instructs the terminal to perform the CSI-RS measurement, and also instructs the terminal to report the validity of the measurement result in the case that the CSI-RS measurement result is valid.

In embodiment II, by means of the agreement by the protocol or the indication of the network-side device, the terminal may know that the validity of the measurement result is reported in the case that the first condition is satisfied, thereby avoiding a transmission problem caused by information asymmetry between the terminal and the network-side device, avoiding a waste of network resources, and improving the validity of communications.

Embodiment III

In the embodiment, after the terminal obtains the second information, the terminal may also report fourth information, where the fourth information includes at least one of the following:
1) At least one of the measurement result of the first type or the measurement result of the second type is valid. Reference may be made to the description in embodiment II for a detailed example of the indication method.
2) Both the measurement result of the first type and the measurement result of the second type are valid. For example, the fourth information indicates that both the CSI-RS measurement result and the SSB measurement result are valid. Reference may be made to the description in embodiment II for a detailed example of the indication method.
3) A certain one of the measurement result of the first type and the measurement result of the second type is valid. For example, the fourth information indicates that the CSI-RS measurement result is valid; or the fourth information indicates that the SSB measurement result is valid. Reference may be made to the description in embodiment II for a detailed example of the indication method.

In one example, the fourth information is carried by a first uplink message, the first uplink message includes a fifth indication field and a sixth indication field; or the first uplink message includes a seventh indication field.

The fifth indication field is used for indicating whether the measurement result of the first type is valid; and the sixth indication field is used for indicating whether the measurement result of the second type is valid.

The seventh indication field is used for indicating at least one of the following: both the measurement result of the first type and the measurement result of the second type are valid; at least one of the measurement result of the first type or the measurement result of the second type is valid; and a certain one of the measurement result of the first type and the measurement result of the second type is valid.

In one example, the seventh indication field includes at least one of the following:
- a ninth value, where the ninth value is used for indicating that both the measurement result of the first type and the measurement result of the second type are valid;
- a tenth value, where the tenth value is used for indicating that at least one of the measurement result of the first type or the measurement result of the second type is valid;
- an eleventh value, where the eleventh value is used for indicating that the measurement result of the first type is valid; or
- a twelfth value, where the twelfth value is used for indicating that the measurement result of the second type is valid.

In other examples, when the seventh indication field does not appear in the first uplink message, it may be indicated that both the measurement result of the first type and the measurement result of the second type are invalid. When the seventh indication field is other specified values (values other than the ninth to twelfth values, such as null), it is indicated that both the measurement result of the first type and the measurement result of the second type are invalid.

In other examples, when the seventh indication field is a certain specified value (e.g., 1), by default the terminal is indicated of one of: both the measurement result of the first type and the measurement result of the second type are valid; at least one of the measurement result of the first type or the measurement result of the second type is valid; and one of the measurement result of the first type and the measurement result of the second type is valid; and when the seventh indication field is another specified value (e.g., 0), by default both the measurement result of the first type and the measurement result of the second type are invalid, or one of the measurement result of the first type and the measurement result of the second type is made valid (e.g., the second type is valid).

In embodiment III, the terminal may report the fourth information, and the fourth information may be used for indicating whether the measurement result of the first type is valid and whether the measurement result of the second type is valid, etc., thereby avoiding a transmission problem caused by information asymmetry between the terminal and the network-side device, avoiding a waste of network resources, and improving the validity of communications.

Embodiment IV

The third information is related to the granularity of the terminal performing the non-connected state measurement result, for example, the third information is used for instructing the terminal to perform at least one of the following:

1) reporting the measurement result of the first type and the measurement result of the second type, for example, the third information instructs the terminal to report the CSI-RS and SSB measurement results, instructs the terminal to report the RSSI and COR measurement results, and instructs the terminal to report the measurement results of the licensed frequency band and the unlicensed frequency band;
2) reporting at least one of the measurement result of the first type or the measurement result of the second type, for example, the third information instructs the terminal to report the CSI-RS and SSB measurement results, instructs the terminal to report the RSSI measurement result, and instructs the terminal to report the measurement result of the unlicensed frequency band, where similarly, the indication method is also applicable to reporting the RSSI and COR measurement results, and is also applicable to reporting the measurement results of the licensed and unlicensed frequency bands;
3) reporting a certain one of the measurement result of the first type or the measurement result of the second type, for example, the third information instructs the terminal to report the SSB measurement results, and instructs the terminal to report the COR measurement result, where similarly, the indication method is also applicable to reporting the RSSI and COR measurement results, and is also applicable to reporting the measurement results of the licensed and unlicensed frequency bands; or
4) not reporting the measurement result of the first type and the measurement result of the second type, for example, the third information instructs the terminal not to report the CSI-RS and SSB measurement results, instructs the terminal not to report the RSSI and COR measurement results, and instructs the terminal not to report the measurement results of the licensed frequency band and the unlicensed frequency band.

As stated above, the third information may be agreed by the protocol, and may also be obtained from the received third network indication message.

In a case that the third information is agreed by the protocol, the manner of the agreement by the protocol is similar to the agreement manners of the first information and the second information in embodiments I and II, and details are not described again herein.

In a case that the third information is obtained from the received third network indication message, the third network indication message includes an eighth indication field and a ninth indication field; or the third network indication message includes a tenth indication field.

The eighth indication field is used for indicating whether the terminal reports the measurement result of the first type; and the ninth indication field is used for indicating whether the terminal reports the measurement result of the second type.

The tenth indication field is used for instructing the terminal to perform at least one of: reporting the measurement result of the first type and the measurement result of the second type; reporting at least one of the measurement result of the first type or the measurement result of the second type; reporting a certain one of the measurement result of the first type and the measurement result of the second type; or not reporting the measurement result of the first type and the measurement result of the second type.

The third network indication message mentioned in the embodiments of this application may be a broadcast message, and may also be dedicated signaling.

In one example, the tenth indication field includes at least one of the following:

a thirteenth value, where the thirteenth value is used for instructing the terminal to report the measurement result of the first type and the measurement result of the second type, and in the example, in a case that the tenth indication field is the thirteenth value, the terminal reports the measurement result of the first type and the measurement result of the second type;

a fourteenth value, where the fourteenth value is used for instructing the terminal to report at least one of the measurement result of the first type or the measurement result of the second type, and in the example, in a case that the tenth indication field is the fourteenth value, the terminal reports at least one of the measurement result of the first type or the measurement result of the second type is valid;

a fifteenth value, where the fifteenth value is used for instructing the terminal to report the measurement result of the first type, and in the example, in a case that the tenth indication field is the fifteenth value, the terminal reports the measurement result of the first type; or a sixteenth value, where the sixteenth value is used for instructing the terminal to report the measurement result of the second type, and in the example, in a case that the tenth indication field is the sixteenth value, the terminal reports the measurement result of the second type.

Optionally, in one example, the tenth indication field may also include a seventeenth value, used for instructing the terminal not to report the measurement result of the first type and the measurement result of the second type.

Optionally, if the tenth indication field does not appear, the terminal is instructed not to report the measurement result of the first type and the measurement result of the second type.

It should be noted that the first network indication message, the second network indication message, and the third network indication message mentioned in the embodiments above may be the same or different. For example, the first network indication message and the second network indication message being the same means that the terminal obtains the first information and the second information according to the same network indication message transmitted by a network.

Embodiment V

In the embodiment, the terminal (a UE) performs the non-connected state measurement according to a broadcast message.

At step 1, the UE is in an inactive state, a CSI-RS measurement configuration and an SSB measurement configuration are saved, and the configurations may be obtained through dedicated signaling (e.g., RRCRelease) or a broadcast message (e.g., SIB1).

At step 2, the UE selects or re-selects a cell and selects a cell 1.

At step 3, the UE reads a broadcast message of the cell 1 (e.g. SIB1) to determine whether to perform the non-connected state measurement:

If SIB1 instructs the UE to measure CSI-RS (e.g. idleModeMeasurementsNR-CSIRS is included in SIB1), the UE measures only the CSI-RS.

If SIB1 instructs the UE to measure the SSB (e.g. idleModeMeasurementsNR-SSB is included in SIB1), the UE measures only the SSB.

If SIB1 instructs the UE to measure two reference signals (e.g. idleModeMeasurementsNR is included in SIB1, or both idleModeMeasurementsNR-CSIRS and idleModeMeasurementsNR-SSB are included), the UE measures the CSI-RS and the SSB.

If SIB1 instructs the UE not to measure (e.g. idleModeMeasurementsNR is not included in SIB1, or idleModeMeasurementsNR-CSIRS and idleModeMeasurementsNR-SSB are not included), the UE does not perform the non-connected state measurement.

At step 4, the UE performs the non-connected state measurement.

Embodiment VI

In the embodiment, the UE reports the validity of the measurement result according to the broadcast message.

At step 1, the UE performs the non-connected state measurement to obtain a valid CSI-RS measurement result.

At step 2, a network system message instructs the UE to report the validity of the measurement result in the following way.

Step 2 may be divided into the following four cases from 2.1 to 2.4.

2.1, when the CSI-RS measurement result is valid, it is reported that the measurement result is valid.

2.2, when the SSB measurement result is valid, it is reported that the measurement result is valid.

2.3, when at least one of the SSB or CSI-RS measurement results is valid, it is reported that the measurement result is valid.

2.4, when both the SSB and CSI-RS measurement results are valid, it is reported that the measurement results are valid.

At step 3, the UE reports the validity of the measurement result in the following ways.

For step 2.1, the UE indicates that the network measurement result is valid.

For step 2.2, the UE does not indicate to the network.

For step 2.3, the UE indicates that the network measurement result is valid. Further, the UE may indicate that the CSI-RS measurement result is valid (e.g., idleMeasAvailable-CSIRS).

For step 2.4, the UE does not indicate to the network.

In the above process, the indication information in the broadcast message may instruct the UE to perform the measurement and reports the validity simultaneously, for example, the network instructs the UE to perform the CSI-RS measurement (idleModeMeasurementsNR-CSIRS), the UE measures the CSI-RS, and when the result is valid, it is reported that the measurement result is valid.

Embodiment VII

In the embodiment, the UE reports the measurement result according to the broadcast message.

At step 1, the UE performs the non-connected state measurement to obtain the CSI-RS measurement result.

At step 2, the UE reports the measurement result according to the indication information of the network.

Step 2 may be divided into the following three cases from 2.1 to 2.3.

2.1, the network instructs the UE to report the CSI-RS measurement result.

2.2, the network instructs the UE to report the SSB measurement result.

2.3, the network instructs the UE to report at least one of the CSI-RS or SSB measurement results.

At step 3, according to the indication information in step 2, the UE performs:

For step 2.1, the UE reports the CSI-RS measurement result.

For step 2.2, the UE does not report because there is no valid SSB measurement result.

For step 2.3, the UE reports the CSI-RS measurement result.

It should be noted that embodiments I to VII above may also be combined, to constitute a new embodiment, and to avoid repetition, examples are not repeatedly given again herein. It should also be noted that some of the detailed descriptions in the embodiments above may refer to each other.

The above describes in detail the measurement indication method according to the embodiment of this application with reference to FIG. 2. The following will describe in detail the measurement indication method according to another embodiment of this application with reference to FIG. 3. It may be understood that the interaction between the network-side device and the terminal described from the network-side device is the same as the description of the terminal side in the method shown in FIG. 2, and to avoid repetition, the related description is appropriately omitted.

FIG. 3 is a schematic implementation flowchart of the measurement indication method according to the embodiment of this application, which may be applied to a network-side device. As shown in FIG. 3, a method 300 includes:

S302: transmitting at least one of a first network indication message, a second network indication message, or a third network indication message; where the first network indication message is related to a granularity of the terminal performing a non-connected state measurement; the second network indication message is related to a granularity of the terminal reporting validity of a non-connected state measurement result; the third network indication message is related to a granularity of the terminal reporting the non-connected state measurement result; and the granularity is related to at least one of a reference signal, a measurement quantity, or a frequency band.

According to the measurement indication method provided by the embodiments of this application, a network-side device may transmit at least one of a first network indication message, a second network indication message, or a third network indication message, where the first network indication message is related to a granularity of the terminal performing a non-connected state measurement, the second network indication message is related to a granularity of the terminal reporting validity of a non-connected state measurement result, the third network indication message is related to a granularity of the terminal reporting the non-connected state measurement result, and the granularity mentioned above is related to at least one of a reference signal, a measurement quantity, or a frequency band, so that the terminal can perform non-connected state measurement reporting, etc. based on at least one of the first network indication message, the second network indication message, or the third network indication message, thereby avoiding a transmission problem caused by information asymmetry between the terminal and the network-side device, avoiding a waste of network resources, and improving the validity of communications.

Optionally, as an embodiment,
the reference signal includes a first type and a second type, the first type includes a CSI-RS, and the second type includes an SSB; or
the measurement quantity includes a first type and a second type, the first type includes an RSSI, and the second type includes a COR; or
the frequency band includes a first type and a second type, the first type includes a licensed frequency band, and the second type includes an unlicensed frequency band.

Optionally, as an embodiment, the first network indication message is used for indicating a behavior of the terminal, which includes one of the following:
performing measurements based on the first type and the second type;
not performing the measurements based on the first type and the second type;
performing the measurements based on at least one of the first type or the second type; and
performing the measurements based on a certain one of the first type and the second type.

Optionally, as an embodiment, the first network indication message includes:
a first indication field and a second indication field, where the first indication field is used for indicating whether the terminal performs the measurement based on the first type; and the second indication field is used for indicating whether the terminal performs the measurement based on the second type; or
a third indication field, where the third indication field is used for instructing the terminal to perform at least one of: performing the measurements based on the first type or the second type; performing the measurements based on at least one of the first type or the second type; performing the measurements based on a certain one of the first type and the second type; and not performing the measurements based on the first type and the second type.

Optionally, as an embodiment, the third indication field includes at least one of the following:
a first value, where the first value is used for instructing the terminal to perform the measurements based on the first type and the second type;
a second value, where the second value is used for instructing the terminal to perform the measurements based on at least one of the first type or the second type;
a third value, where the third value is used for instructing the terminal to perform the measurement based on the first type; or
a fourth value, where the fourth value is used for instructing the terminal to perform the measurement based on the second type.

Optionally, as an embodiment, the second network indication message is used for instructing the terminal to report the validity of the measurement result in a case that a first condition is satisfied.

Optionally, as an embodiment, the first condition includes one of the following:
at least one of the measurement result of the first type or the measurement result of the second type is valid;
both the measurement result of the first type and the measurement result of the second type are valid; and
a certain one of the measurement result of the first type and the measurement result of the second type is valid.

Optionally, as an embodiment, the second network indication message includes a fourth indication field, and the fourth indication field includes at least one of the following:
a fifth value, where the fifth value is used for instructing the terminal to report the validity of the measurement result in the case that at least one of the measurement result of the first type or the measurement result of the second type is valid;
a sixth value, where the sixth value is used for instructing the terminal to report the validity of the measurement results in the case that both the measurement result of the first type and the measurement result of the second type are valid;
a seventh value, where the seventh value is used for instructing the terminal to report the validity of the measurement result in the case that the measurement result of the first type is valid; or
the eighth value, where the eighth value is used for instructing the terminal to report the validity of the measurement result in the case that the measurement result of the second type is valid.

Optionally, as an embodiment, the method further includes: receiving a first uplink message, where the first uplink message includes at least one of the following:
at least one of the measurement result of the first type and the measurement result of the second type is valid;
both the measurement result of the first type and the measurement result of the second type are valid; or
a certain one of the measurement result of the first type and the measurement result of the second type is valid.

Optionally, as an embodiment, the first uplink message includes:
a fifth indication field and a sixth indication field; where the fifth indication field is used for indicating whether the measurement result of the first type is valid; and the sixth indication field is used for indicating whether the measurement result of the second type is valid; or
a seventh indication field, where the seventh indication field is used for indicating at least one of the following: both the measurement result of the first type and the measurement result of the second type are valid; at least one of the measurement result of the first type or the measurement result of the second type is valid; or a certain one of the measurement result of the first type and the measurement result of the second type is valid.

Optionally, as an embodiment, the seventh indication field includes at least one of the following:
a ninth value, where the ninth value is used for indicating that both the measurement result of the first type and the measurement result of the second type are valid;
a tenth value, where the tenth value is used for indicating that at least one of the measurement result of the first type or the measurement result of the second type is valid;
an eleventh value, where the eleventh value is used for indicating that the measurement result of the first type is valid; or
a twelfth value, where the twelfth value is used for indicating that the measurement result of the second type is valid.

Optionally, as an embodiment, the third network indication message is used for instructing the terminal to perform at least one of:

reporting the measurement result of the first type and the measurement result of the second type;
reporting at least one of the measurement result of the first type or the measurement result of the second type;
reporting a certain one of the measurement result of the first type or the measurement result of the second type; or
not reporting the measurement result of the first type and the measurement result of the second type.

Optionally, as an embodiment, the third network indication message includes:
an eighth indication field and a ninth indication field, where the eighth indication field is used for indicating whether the terminal reports the measurement result of the first type; and the ninth indication field is used for indicating whether the terminal reports the measurement result of the second type; or
a tenth indication field, where the tenth indication field is used for instructing the terminal to perform at least one of: reporting the measurement result of the first type and the measurement result of the second type; reporting at least one of the measurement result of the first type or the measurement result of the second type; reporting a certain one of the measurement result of the first type and the measurement result of the second type; or not reporting the measurement result of the first type and the measurement result of the second type.

Optionally, as an embodiment, the tenth indication field includes at least one of the following:
a thirteenth value, where the thirteenth value is used for instructing the terminal to report the measurement result of the first type and the measurement result of the second type;
a fourteenth value, where the fourteenth value is used for instructing the terminal to report at least one of the measurement result of the first type or the measurement result of the second type;
a fifteenth value, where the fifteenth value is used for instructing the terminal to report the measurement result of the first type; or
a sixteenth value, where the sixteenth value is used for instructing the terminal to report the measurement result of the second type.

It should be noted that the execution subject of the measurement indication method provided by the embodiment of this application may be a measurement indication apparatus, or a control module in the measurement indication apparatus used for performing the measurement indication method. In the embodiments of this application, taking the measurement indication apparatus performing the measurement indication method is an example, the measurement indication apparatus provided by the embodiments of this application is described.

FIG. 4 is a schematic structural diagram of a measurement indication apparatus according to embodiments of this application. The apparatus may correspond to a terminal in other embodiments. As shown in FIG. 4, an apparatus 400 includes:
an obtaining module 402, configured to obtain at least one of first information, second information, or third information;
where the first information is related to a granularity of the terminal performing a non-connected state measurement; the second information is related to a granularity of the terminal reporting validity of a non-connected state measurement result; the third information is related to a granularity of the terminal reporting the non-connected state measurement result; and
the granularity is related to at least one of a reference signal, a measurement quantity, or a frequency band.

The measurement indication apparatus provided by the embodiments of this application may obtain at least one of first information, second information, or third information, where the first information is related to a granularity of the terminal performing a non-connected state measurement, the second information is related to a granularity of the terminal reporting validity of a non-connected state measurement result, the third information is related to a granularity of the terminal reporting the non-connected state measurement result, and the granularity mentioned above is related to at least one of a reference signal, a measurement quantity, or a frequency band, so that the terminal can perform non-connected state measurement reporting, etc. based on at least one of the first information, the second information, or the third information, thereby avoiding a transmission problem caused by information asymmetry between the terminal and a network-side device, avoiding a waste of network resources, and improving the validity of communications.

Optionally, as an embodiment,
the reference signal includes a first type and a second type, the first type includes a channel state information-reference signal (CSI-RS), and the second type includes a synchronization signal and physical broadcast channel block (SSB); or
the measurement quantity includes a first type and a second type, the first type includes a received signal strength indication (RSSI), and the second type includes a channel occupancy ratio (COR); or
the frequency band includes a first type and a second type, the first type includes a licensed frequency band, and the second type includes an unlicensed frequency band.

Optionally, as an embodiment, the first information is used for indicating a behavior of the terminal, which includes one of the following:
performing measurements based on the first type and the second type;
not performing the measurements based on the first type and the second type;
performing the measurements based on at least one of the first type or the second type; and
performing the measurements based on a certain one of the first type and the second type.

Optionally, as an embodiment, the first information is obtained from a received first network indication message, and the first network indication message includes:
a first indication field and a second indication field, where the first indication field is used for indicating whether the terminal performs the measurement based on the first type; and the second indication field is used for indicating whether the terminal performs the measurement based on the second type; or
a third indication field, where the third indication field is used for instructing the terminal to perform at least one of: performing the measurements based on the first type and the second type; performing the measurements based on at least one of the first type or the second type; performing the measurements based on a certain one of the first type and the second type; or not performing the measurements based on the first type and the second type.

Optionally, as an embodiment, the third indication field includes at least one of the following:

a first value, where the first value is used for instructing the terminal to perform the measurements based on the first type and the second type;
a second value, where the second value is used for instructing the terminal to perform the measurements based on at least one of the first type or the second type;
a third value, where the third value is used for instructing the terminal to perform the measurement based on the first type; or
a fourth value, where the fourth value is used for instructing the terminal to perform the measurement based on the second type.

Optionally, as an embodiment, the second information is used for instructing the terminal to report the validity of the measurement result in a case that a first condition is satisfied.

Optionally, as an embodiment, the first condition includes one of the following:
at least one of the measurement result of the first type or the measurement result of the second type is valid;
both the measurement result of the first type and the measurement result of the second type are valid; or
a certain one of the measurement result of the first type and the measurement result of the second type is valid.

Optionally, as an embodiment, the first condition is obtained from a received second network indication message, the second network indication message includes a fourth indication field, and the fourth indication field includes at least one of the following:
a fifth value, where the fifth value is used for instructing the terminal to report the validity of the measurement result in the case that at least one of the measurement result of the first type or the measurement result of the second type is valid;
a sixth value, where the sixth value is used for instructing the terminal to report the validity of the measurement results in the case that both the measurement result of the first type and the measurement result of the second type are valid;
a seventh value, where the seventh value is used for instructing the terminal to report the validity of the measurement result in the case that the measurement result of the first type is valid; or
the eighth value, where the eighth value is used for instructing the terminal to report the validity of the measurement result in the case that the measurement result of the second type is valid.

Optionally, as an embodiment, the apparatus 400 further includes a transmitting module, configured to report fourth information, where the fourth information includes at least one of the following:
at least one of the measurement result of the first type or the measurement result of the second type is valid;
both the measurement result of the first type and the measurement result of the second type are valid; or
a certain one of the measurement result of the first type and the measurement result of the second type is valid.

Optionally, as an embodiment, the fourth information is carried by a first uplink message, and the first uplink message includes:
a fifth indication field and a sixth indication field; where the fifth indication field is used for indicating whether the measurement result of the first type is valid; and the sixth indication field is used for indicating whether the measurement result of the second type is valid; or
a seventh indication field, where the seventh indication field is used for indicating at least one of the following:
both the measurement result of the first type and the measurement result of the second type are valid; at least one of the measurement result of the first type or the measurement result of the second type is valid; or a certain one of the measurement result of the first type and the measurement result of the second type is valid.

Optionally, as an embodiment, the seventh indication field includes at least one of the following:
a ninth value, where the ninth value is used for indicating that both the measurement result of the first type and the measurement result of the second type are valid;
a tenth value, where the tenth value is used for indicating that at least one of the measurement result of the first type or the measurement result of the second type is valid;
an eleventh value, where the eleventh value is used for indicating that the measurement result of the first type is valid; or
a twelfth value, where the twelfth value is used for indicating that the measurement result of the second type is valid.

Optionally, as an embodiment, the third information is used for instructing the terminal to perform at least one of the following:
reporting the measurement result of the first type and the measurement result of the second type;
reporting at least one of the measurement result of the first type or the measurement result of the second type;
reporting a certain one of the measurement result of the first type or the measurement result of the second type; or
not reporting the measurement result of the first type and the measurement result of the second type.

Optionally, as an embodiment, the third information is obtained from a received third network indication message, and the third network indication message includes:
an eighth indication field and a ninth indication field, where the eighth indication field is used for indicating whether the terminal reports the measurement result of the first type; and the ninth indication field is used for indicating whether the terminal reports the measurement result of the second type; or
a tenth indication field, where the tenth indication field is used for instructing the terminal to perform at least one of: reporting the measurement result of the first type and the measurement result of the second type; reporting at least one of the measurement result of the first type or the measurement result of the second type; reporting a certain one of the measurement result of the first type and the measurement result of the second type; or not reporting the measurement result of the first type and the measurement result of the second type.

Optionally, as an embodiment, the tenth indication field includes at least one of the following:
a thirteenth value, where the thirteenth value is used for instructing the terminal to report the measurement result of the first type and the measurement result of the second type;
a fourteenth value, where the fourteenth value is used for instructing the terminal to report at least one of the measurement result of the first type or the measurement result of the second type;
a fifteenth value, where the fifteenth value is used for instructing the terminal to report the measurement result of the first type; or
a sixteenth value, where the sixteenth value is used for instructing the terminal to report the measurement result of the second type.

The apparatus 400 according to the embodiments of this application may refer to the process corresponding to the method 200 according to the embodiments of this application, and the units/modules in the apparatus 400 and the other operations and/or functions above are to implement the corresponding process in the method 200, and can achieve the same or equivalent technical effects. For brevity, details are not described herein again.

The apparatus 400 in the embodiments of this application may be an apparatus, and may also be a component in a terminal, an integrated circuit, or a chip. The apparatus may be a mobile terminal, and may also be a non-mobile terminal. Exemplarily, the mobile terminal may include, but is not limited to, the type of terminal 11 listed above, and the non-mobile terminal may be a server, a network attached storage (NAS), a personal computer (PC), a television (TV), a teller machine or a self-service machine, etc. No specific definition is made in the embodiments of this application.

The apparatus 400 in the embodiments of this application may be an apparatus having an operating system. The operating system may be an Android operating system, may be an IOS operating system, and may also be other possible operating system. No specific definition is made in the embodiments of this application.

The apparatus 400 provided by the embodiments of this application can achieve the processes implemented by the embodiments of the method of FIG. 2, and achieves the same technical effects, and to avoid repetition, details are not described herein again.

FIG. 5 is a schematic structural diagram of a measurement indication apparatus according to the embodiments of this application. The apparatus may correspond to a network-side device in other embodiments. As shown in FIG. 5, an apparatus 500 includes:

a transmitting module 502, configured to transmit at least one of a first network indication message, a second network indication message, or a third network indication message;

where the first network indication message is related to a granularity of a terminal performing a non-connected state measurement; the second network indication message is related to a granularity of the terminal reporting validity of a non-connected state measurement result; the third network indication message is related to a granularity of the terminal reporting the non-connected state measurement result; and the granularity is related to at least one of a reference signal, a measurement quantity, or a frequency band.

The measurement indication apparatus provided by the embodiments of this application may transmit at least one of a first network indication message, a second network indication message, or a third network indication message, where the first network indication message is related to a granularity of a terminal performing a non-connected state measurement, the second network indication message is related to a granularity of the terminal reporting validity of a non-connected state measurement result, the third network indication message is related to a granularity of the terminal reporting the non-connected state measurement result, and the granularity mentioned above is related to at least one of a reference signal, a measurement quantity, or a frequency band, so that the terminal can perform non-connected state measurement reporting, etc. based on at least one of the first network indication message, the second network indication message, or the third network indication message, thereby avoiding a transmission problem caused by information asymmetry between the terminal and the network-side device, avoiding a waste of network resources, and improving the validity of communications.

Optionally, as an embodiment,
the reference signal includes a first type and a second type, the first type includes a CSI-RS, and the second type includes an SSB; or
the measurement quantity includes a first type and a second type, the first type includes an RSSI, and the second type includes a COR; or
the frequency band includes a first type and a second type, the first type includes a licensed frequency band, and the second type includes an unlicensed frequency band.

Optionally, as an embodiment, the first network indication message is used for indicating a behavior of the terminal, which includes one of the following:
performing measurements based on the first type and the second type;
not performing the measurements based on the first type and the second type;
performing the measurements based on at least one of the first type or the second type; and
performing the measurements based on a certain one of the first type and the second type.

Optionally, as an embodiment, the first network indication message includes:
a first indication field and a second indication field, where the first indication field is used for indicating whether the terminal performs the measurement based on the first type; and the second indication field is used for indicating whether the terminal performs the measurement based on the second type; or
a third indication field, where the third indication field is used for instructing the terminal to perform at least one of: performing the measurements based on the first type and the second type; performing the measurements based on at least one of the first type or the second type; performing the measurements based on a certain one of the first type and the second type; or not performing the measurements based on the first type and the second type.

Optionally, as an embodiment, the third indication field includes at least one of the following:
a first value, where the first value is used for instructing the terminal to perform the measurements based on the first type and the second type;
a second value, where the second value is used for instructing the terminal to perform the measurements based on at least one of the first type or the second type;
a third value, where the third value is used for instructing the terminal to perform the measurement based on the first type; or
a fourth value, where the fourth value is used for instructing the terminal to perform the measurement based on the second type.

Optionally, as an embodiment, the second network indication message is used for instructing the terminal to report the validity of the measurement result in a case that a first condition is satisfied.

Optionally, as an embodiment, the first condition includes one of the following:
at least one of the measurement result of the first type or the measurement result of the second type is valid;
both the measurement result of the first type and the measurement result of the second type are valid; and
a certain one of the measurement result of the first type and the measurement result of the second type is valid.

Optionally, as an embodiment, the second network indication message includes a fourth indication field, and the fourth indication field includes at least one of the following:

a fifth value, where the fifth value is used for instructing the terminal to report the validity of the measurement result in the case that at least one of the measurement result of the first type or the measurement result of the second type is valid;

a sixth value, where the sixth value is used for instructing the terminal to report the validity of the measurement results in the case that both the measurement result of the first type and the measurement result of the second type are valid;

a seventh value, where the seventh value is used for instructing the terminal to report the validity of the measurement result in the case that the measurement result of the first type is valid; or the eighth value, where the eighth value is used for instructing the terminal to report the validity of the measurement result in the case that the measurement result of the second type is valid.

Optionally, as an embodiment, the apparatus 500 further includes a receiving module, configured to receive a first uplink message, where the first uplink message includes at least one of the following:

at least one of the measurement result of the first type or the measurement result of the second type is valid;

both the measurement result of the first type and the measurement result of the second type are valid; or a certain one of the measurement result of the first type and the measurement result of the second type is valid.

Optionally, as an embodiment, the first uplink message includes:

a fifth indication field and a sixth indication field; where the fifth indication field is used for indicating whether the measurement result of the first type is valid; and the sixth indication field is used for indicating whether the measurement result of the second type is valid; or a seventh indication field, where the seventh indication field is used for indicating at least one of the following: both the measurement result of the first type and the measurement result of the second type are valid; at least one of the measurement result of the first type or the measurement result of the second type is valid; or a certain one of the measurement result of the first type and the measurement result of the second type is valid.

Optionally, as an embodiment, the seventh indication field includes at least one of the following:

a ninth value, where the ninth value is used for indicating that both the measurement result of the first type and the measurement result of the second type are valid;

a tenth value, where the tenth value is used for indicating that at least one of the measurement result of the first type or the measurement result of the second type is valid;

an eleventh value, where the eleventh value is used for indicating that the measurement result of the first type is valid; and a twelfth value, where the twelfth value is used for indicating that the measurement result of the second type is valid.

Optionally, as an embodiment, the third network indication message is used for instructing the terminal to perform at least one of:

reporting the measurement result of the first type and the measurement result of the second type;

reporting at least one of the measurement result of the first type or the measurement result of the second type;

reporting a certain one of the measurement result of the first type or the measurement result of the second type; or not reporting the measurement result of the first type and the measurement result of the second type.

Optionally, as an embodiment, the third network indication message includes:

an eighth indication field and a ninth indication field, where the eighth indication field is used for indicating whether the terminal reports the measurement result of the first type; and the ninth indication field is used for indicating whether the terminal reports the measurement result of the second type; or a tenth indication field, where the tenth indication field is used for instructing the terminal to perform at least one of: reporting the measurement result of the first type and the measurement result of the second type; reporting at least one of the measurement result of the first type or the measurement result of the second type; reporting a certain one of the measurement result of the first type and the measurement result of the second type; or not reporting the measurement result of the first type and the measurement result of the second type.

Optionally, as an embodiment, the tenth indication field includes at least one of the following:

a thirteenth value, where the thirteenth value is used for instructing the terminal to report the measurement result of the first type and the measurement result of the second type;

a fourteenth value, where the fourteenth value is used for instructing the terminal to report at least one of the measurement result of the first type or the measurement result of the second type;

a fifteenth value, where the fifteenth value is used for instructing the terminal to report the measurement result of the first type; or a sixteenth value, where the sixteenth value is used for instructing the terminal to report the measurement result of the second type.

The apparatus 500 according to the embodiments of this application may refer to the process corresponding to the method 300 according to the embodiments of this application, and the units/modules in the apparatus 500 and the other operations and/or functions above are to implement the corresponding process in the method 300, and can achieve the same or equivalent technical effects. For brevity, details are not described herein again.

Optionally, as shown in FIG. 6, the embodiments of this application further provide a communication device 600, including a processor 601, a memory 602, and a program or instruction that is stored in the memory 602 and executable on the processor 601, for example, when the communication device 600 is a terminal, when the program or instruction is executed by the processor 601, the processes of the embodiments of the measurement indication method are implemented, and the same technical effects can be achieved. When the communication device 600 is a network-side device, when the program or instruction is executed by the processor 601, the processes of the embodiments of the measurement indication method are implemented, and the same technical effects can be achieved. To avoid repetition, details are not described herein again.

Figure 7:
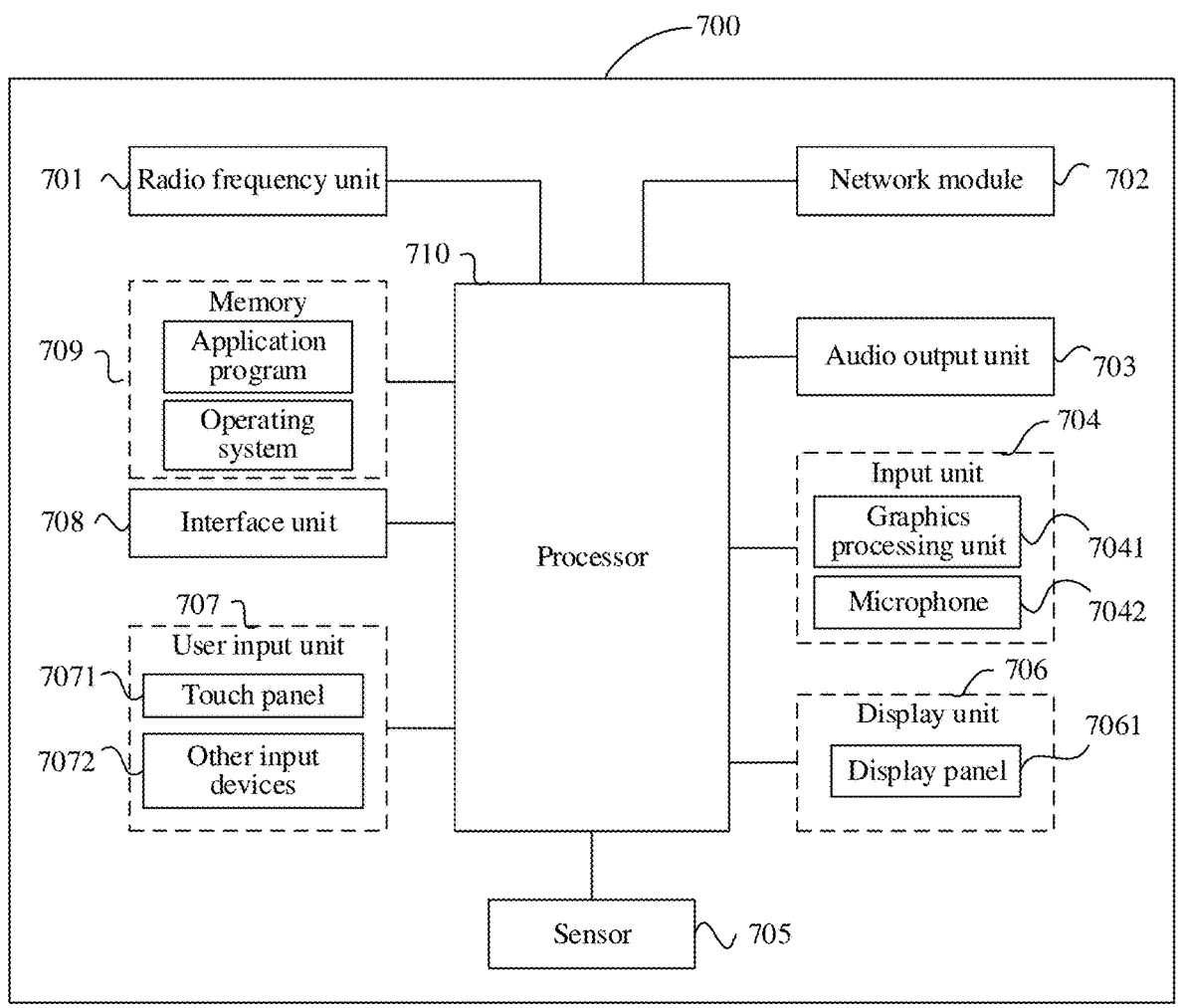
FIG. 7 is a schematic structural diagram of a terminal according to one embodiment of this application.

FIG. 7 is a schematic structural diagram of hardware of a terminal implementing an embodiment of this application.

The terminal 700 includes, but is not limited to: components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 further includes a power supply (e.g., a battery) supplying power to each component, and the power supply may be logically connected to the processor 710 through a power management system, so that functions such as charging management, discharging management, and power consumption management are achieved through the power management system. The terminal structure shown in FIG. 7 does not form a limitation to the terminal, and the terminal may include more or less components than those shown in the drawing, or combines some components, or adopts different component arrangements. Details are not described herein again.

It should be understood that in the embodiment of this application, the input unit 704 may include a graphics processing unit (GPU) 7041 and a microphone 7042, and the graphics processing unit 7041 processes image data of a static picture or video obtained by an image capture device (e.g., a camera) in a video capture mode or image capture mode. The display unit 706 may include a display panel 7061, and the display panel 7061 may be configured in the form of a liquid crystal display, an organic light-emitting diode, etc. The user input unit 707 includes a touch panel 7071 and other input devices 7072. The touch panel 7071 is also referred to as a touch screen. The touch panel 7071 may include two portions, i.e., a touch detection device and a touch controller. The other input devices 7072 may include, but are not limited to, a physical keyboard, function keys (such as a volume control key and an on/off key), a trackball, a mouse, and an operating rod. Details are not described herein again.

In the embodiment of this application, the radio frequency unit 701 receives downlink data from a network-side device, and transmits same to the processor 710 for processing; in addition, uplink data is transmitted to the network-side device. Usually, the radio frequency unit 701 includes, but is not limited to, an antenna, at least one amplifier, a transceiver, a coupler, a low noise amplifier, a duplexer, etc.

The memory 709 may be configured to store a software program or instruction and various data. The memory 709 may mainly include a storage program or instruction area and a storage data area, where the storage program or instruction area may store an operating system, an application program or instruction required by at least one function (such as a sound playback function and an image playback function), etc. In addition, the memory 709 may include a high-speed random access memory, and may also include a non-volatile memory, where the non-volatile memory may be a read-only memory (ROM), a programmable ROM (PROM), an erasable PROM (EPROM), an electrically EPROM (EEPROM), or a flash memory, for example, at least one magnetic disk storage device, a flash memory device, or other non-volatile solid-state memory devices.

The processor 710 may include one or more processing units. Optionally, the processor 710 may integrate an application processor and a modem processor, where the application processor mainly processes the operating system, a user interface, the application program or instruction, etc., and the modem processor mainly processes wireless communications, such as a baseband processor. It may be understood that the modem processor may also not be integrated into the processor 710.

The processor 710 is configured to obtain at least one of first information, second information, or third information; where the first information is related to a granularity of the terminal performing a non-connected state measurement; the second information is related to a granularity of the terminal reporting validity of a non-connected state measurement result; the third information is related to a granularity of the terminal reporting the non-connected state measurement result; and the granularity is related to at least one of a reference signal, a measurement quantity, or a frequency band.

In the embodiment of this application, a terminal may obtain at least one of first information, second information, or third information, where the first information is related to a granularity of the terminal performing a non-connected state measurement, the second information is related to a granularity of the terminal reporting validity of a non-connected state measurement result, the third information is related to a granularity of the terminal reporting the non-connected state measurement result, and the granularity mentioned above is related to at least one of a reference signal, a measurement quantity, or a frequency band, so that the terminal can perform non-connected state measurement reporting, etc. based on at least one of the first information, the second information, or the third information, thereby avoiding a transmission problem caused by information asymmetry between the terminal and a network-side device, avoiding a waste of network resources, and improving the validity of communications.

Figure 8:
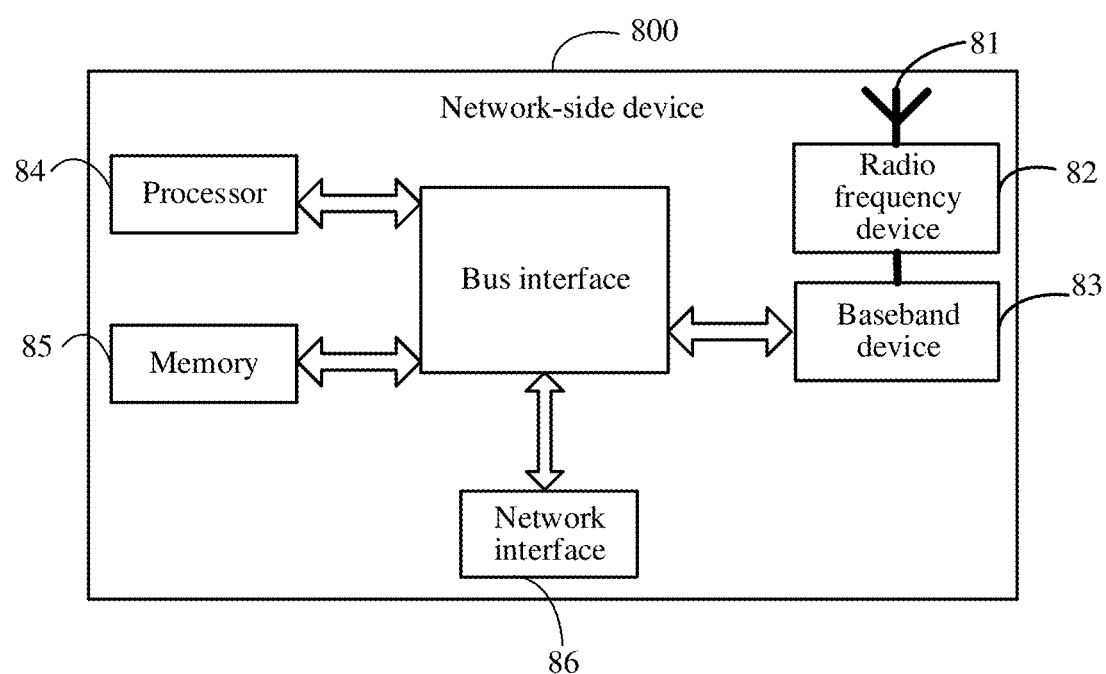
FIG. 8 is a schematic structural diagram of a network-side device according to one embodiment of this application.

The embodiments of this application further provide a network-side device. As shown in FIG. 8, the network device 800 includes: an antenna 81, a radio frequency device 82, and a baseband device 83. The antenna 81 is connected to the radio frequency device 82. In an uplink direction, the radio frequency device 82 receives information through the antenna 81, and transmits the received information to the baseband device 83 for processing. In a downlink direction, the baseband device 83 processes the information to be transmitted and transmits same to the radio frequency device 82, and the radio frequency device 82 processes the received information and transmits out same through the antenna 81.

The frequency band processing device may be located in the baseband device 83, the method performed by the network-side device in the embodiments above may be implemented in the baseband device 83, and the baseband device 83 includes a processor 84 and a memory 85.

The baseband device 83 may include, for example, at least one baseband board, the baseband board is provided with a plurality of chips, and as shown in FIG. 8, one of the chips, for example, the processor 84, is connected to the memory 85 to invoke the program in the memory 85, to perform the operations of the network device shown in the embodiments of the method above.

The baseband device 83 may further include a network interface 86, configured to exchange information with the radio frequency device 82, and the interface is, for example, a common public radio interface (CPRI).

For example, the network-side device according to the embodiments of the present disclosure further include: an instruction or program that is stored in the memory 85 and executable on the processor 84, the processor 84 invokes the instruction or the program in the memory 85 to perform the method performed by the modules shown in FIG. 5, and the same technical effects are achieved. To avoid repetition, details are not described herein again.

The embodiments of this application further provide a non-transitory readable storage medium having a program or instruction stored thereon, where the program or instruction is executed by a processor, the processes of the embodiments of the measurement indication method are implemented, and the same technical effects are can achieved. To avoid repetition, details are not described herein again.

The processor may be a processor in the terminal in the embodiments above. The non-transitory readable storage medium includes a non-transitory computer-readable storage medium, such as a read-only memory (ROM), a random access memory (RAM), a magnetic disk, or an optical disk.

The embodiments of this application additionally provide a chip. The chip includes a processor and a communication interface, where the communication interface is coupled to the processor, and the processor is configured to run a program or instruction to implement the processes of the embodiments of the measurement indication method, and the same technical effects can be achieved. To avoid repetition, details are not described herein again.

It should be understood that the chip mentioned in the embodiments of this application may also be referred to as a system on chip, a system-on-chip, a chip system, a system on a chip, or the like.

It should be noted that the terms "comprise", "include", or any other variants thereof are intended to cover non-exclusive inclusion, so that a process, method, article or apparatus that includes a series of elements includes not only those elements, but also other elements that are not explicitly listed or elements inherent to the process, method, article or apparatus. In a case that no more limitations are made, an element defined by a phrase "including one . . . " does not exclude that there are other same elements in the process, method, article or apparatus including the element. In addition, it should be noted that the method and apparatus in the implementation modes of this application are not limited to performing functions in the order shown or discussed, and may also perform the functions involved in a substantially simultaneous manner or in a reverse order, e.g., the method described may be performed in an order different from that described, and various steps may also be added, omitted, or combined. In addition, the features described with reference to some certain examples may be combined in other examples.

By means of the description of the implementation modes above, a person skilled in the art can clearly know that the method according to the foregoing embodiments may be implemented by software and a necessary common hardware platform, and may also be implemented by the hardware, but in many cases, the former is a better implementation mode. Based on such an understanding, the technical solutions of this application or a part thereof contributing to the prior art may be embodied in the form of a software product. The computer software product is stored in a storage medium (such as a ROM/RAM, a magnetic disk, or an optical disk) and includes several instructions so that a computer device (which may be a mobile phone, a computer, a server, a conditioner, a network device, or the like) implements the method according to the embodiments of this application.

The embodiments of this application are described above with reference to the accompanying drawings, but this application is not limited to the foregoing detailed description. The foregoing detailed description is only schematic but not restrictive. Under the motivation of this application, a person of ordinary skill in the art may make many forms without departing from the purpose of this application and the scopes of protection of the claims, and these all fall within the scope of protection of this application.

What is claimed is:

1. A measurement indication method, applied to a terminal, comprising:
   obtaining at least one of first information, second information, or third information; wherein
   the first information is related to a granularity of the terminal performing a non-connected state measurement; the second information is related to a granularity of the terminal reporting validity of a non-connected state measurement result; the third information is related to a granularity of the terminal reporting the non-connected state measurement result; and
   the granularity is related to at least one of a measurement quantity or a frequency band; wherein
   the measurement quantity comprises a first type and a second type, the first type of the measurement quantity comprises a received signal strength indication (RSSI), the second type of the measurement quantity comprises a channel occupancy ratio (COR), the frequency band comprises a first type and a second type, the first type of the frequency band comprises a licensed frequency band, and the second type of the frequency band comprises an unlicensed frequency band; and
   the first information is obtained from a received first network indication message, and the first network indication message comprises:
   a first indication field and a second indication field, wherein the first indication field is used for indicating whether the terminal performs a measurement based on the first type of at least one of the measurement quantity or the frequency band; and the second indication field is used for indicating whether the terminal performs a measurement based on the second type of at least one of the measurement quantity or the frequency band; or
   a third indication field, wherein the third indication field is used for instructing the terminal to perform at least one of: performing measurements based on the first type of at least one of the measurement quantity or the frequency band and the second type of at least one of the measurement quantity or the frequency band; performing measurements based on at least one of: the first type of at least one of the measurement quantity or the frequency band, or the second type of at least one of the measurement quantity or the frequency band; performing measurements based on a certain one of the first type of at least one of the measurement quantity or the frequency band and the second type of at least one of the measurement quantity or the frequency band; or not performing measurements based on the first type of at least one of the measurement quantity or the frequency band and the second type of at least one of the measurement quantity or the frequency band.

2. The method according to claim 1, wherein the granularity further is related to a reference signal; and
   the reference signal comprises a first type and a second type, the first type of the reference signal comprises a channel state information-reference signal (CSI-RS), and the second type of the reference signal comprises a synchronization signal and physical broadcast channel block (SSB).

3. The method according to claim 2, wherein the second information is used for instructing the terminal to report validity of a measurement result in a case that a first condition is satisfied; wherein
   the first condition comprises one of following:

at least one of: a measurement result of the first type of the reference signal and at least one of the measurement quantity or the frequency band or a measurement result of the second type of the reference signal and at least one of the measurement quantity or the frequency band is valid;

both the measurement result of the first type of the reference signal and at least one of the measurement quantity or the frequency band and the measurement result of the second type of the reference signal and at least one of the measurement quantity or the frequency band are valid; and a certain one of the measurement result of the first type of the reference signal and at least one of the measurement quantity or the frequency band and the measurement result of the second type of the reference signal and at least one of the measurement quantity or the frequency band is valid.

4. The method according to claim 3, wherein the first condition is obtained from a received second network indication message, the second network indication message comprises a fourth indication field, and the fourth indication field comprises at least one of following:

a fifth value, wherein the fifth value is used for instructing the terminal to report validity of a measurement result in a case that at least one of: the measurement result of the first type of the reference signal and at least one of the measurement quantity or the frequency band or the measurement result of the second type of the reference signal and at least one of the measurement quantity or the frequency band is valid;

a sixth value, wherein the sixth value is used for instructing the terminal to report validity of a measurement result in a case that both the measurement result of the first type of the reference signal and at least one of the measurement quantity or the frequency band and the measurement result of the second type of the reference signal and at least one of the measurement quantity or the frequency band are valid;

a seventh value, wherein the seventh value is used for instructing the terminal to report validity of a measurement result in a case that the measurement result of the first type of the reference signal and at least one of the measurement quantity or the frequency band is valid; and an eighth value, wherein the eighth value is used for instructing the terminal to report validity of a measurement result in a case that the measurement result of the second type of the reference signal and at least one of the measurement quantity or the frequency band is valid.

5. The method according to claim 2, after obtaining the second information, further comprising: reporting fourth information, wherein the fourth information comprises at least one of following:

at least one of: a measurement result of the first type of the reference signal and at least one of the measurement quantity or the frequency band or a measurement result of the second type of the reference signal and at least one of the measurement quantity or the frequency band is valid;

both the measurement result of the first type of the reference signal and at least one of the measurement quantity or the frequency band and the measurement result of the second type of the reference signal and at least one of the measurement quantity or the frequency band are valid; or a certain one of the measurement result of the first type of the reference signal and at least one of the measurement quantity or the frequency band and the measurement result of the second type of the reference signal and at least one of the measurement quantity or the frequency band is valid.

6. The method according to claim 5, wherein the fourth information is carried in a first uplink message, and the first uplink message comprises:

a fifth indication field and a sixth indication field, wherein the fifth indication field is used for indicating whether the measurement result of the first type of the reference signal and at least one of the measurement quantity or the frequency band is valid; and the sixth indication field is used for indicating whether the measurement result of the second type of the reference signal and at least one of the measurement quantity or the frequency band is valid; or a seventh indication field, wherein the seventh indication field is used for indicating at least one of following: both the measurement result of the first type of the reference signal and at least one of the measurement quantity or the frequency band and the measurement result of the second type of the reference signal and at least one of the measurement quantity or the frequency band are valid; at least one of: the measurement result of the first type of the reference signal and at least one of the measurement quantity or the frequency band or the measurement result of the second type of the reference signal and at least one of the measurement quantity or the frequency band is valid; or a certain one of the measurement result of the first type of the reference signal and at least one of the measurement quantity or the frequency band and the measurement result of the second type of the reference signal and at least one of the measurement quantity or the frequency band is valid.

7. The method according to claim 2, wherein the third information is used for instructing the terminal to perform at least one of following:

reporting a measurement result of the first type of the reference signal and at least one of the measurement quantity or the frequency band and a measurement result of the second type of the reference signal and at least one of the measurement quantity or the frequency band;

reporting at least one of: the measurement result of the first type of the reference signal and at least one of the measurement quantity or the frequency band or the measurement result of the second type of the reference signal and at least one of the measurement quantity or the frequency band;

reporting a certain one of the measurement result of the first type of the reference signal and at least one of the measurement quantity or the frequency band or the measurement result of the second type of the reference signal and at least one of the measurement quantity or the frequency band; or not reporting the measurement result of the first type of the reference signal and at least one of the measurement quantity or the frequency band and the measurement result of the second type of the reference signal and at least one of the measurement quantity or the frequency band.

8. The method according to claim 7, wherein the third information is obtained from a received third network indication message, and the third network indication message comprises:
an eighth indication field and a ninth indication field, wherein the eighth indication field is used for indicating whether the terminal reports the measurement result of the first type of the reference signal and at least one of the measurement quantity or the frequency band; and the ninth indication field is used for indicating whether the terminal reports the measurement result of the second type of the reference signal and at least one of the measurement quantity or the frequency band; or
a tenth indication field, wherein the tenth indication field is used for instructing the terminal to perform at least one of: reporting the measurement result of the first type of the reference signal and at least one of the measurement quantity or the frequency band or the measurement result of the second type of the reference signal and at least one of the measurement quantity or the frequency band; reporting at least one of: the measurement result of the first type of the reference signal and at least one of the measurement quantity or the frequency band or the measurement result of the second type of the reference signal and at least one of the measurement quantity or the frequency band; reporting a certain one of the measurement result of the first type of the reference signal and at least one of the measurement quantity or the frequency band and the measurement result of the second type of the reference signal and at least one of the measurement quantity or the frequency band; and not reporting the measurement result of the first type of the reference signal and at least one of the measurement quantity or the frequency band and the measurement result of the second type of the reference signal and at least one of the measurement quantity or the frequency band.

9. A measurement indication method, applied to a network-side device, comprising:
transmitting at least one of a first network indication message, a second network indication message, or a third network indication message; wherein
the first network indication message is related to a granularity of a terminal performing a non-connected state measurement; the second network indication message is related to a granularity of the terminal reporting validity of a non-connected state measurement result; the third network indication message is related to a granularity of the terminal reporting the non-connected state measurement result; and
the granularity is related to at least one of a measurement quantity or a frequency band; wherein
the measurement quantity comprises a first type and a second type, the first type of the measurement quantity comprises a received signal strength indication (RSSI), the second type of the measurement quantity comprises a channel occupancy ratio (COR), the frequency band comprises a first type and a second type, the first type of the frequency band comprises a licensed frequency band, and the second type of the frequency band comprises an unlicensed frequency band; and
the first network indication message comprises:
a first indication field and a second indication field, wherein the first indication field is used for indicating whether the terminal performs a measurement based on the first type of at least one of the measurement quantity or the frequency band; and the second indication field is used for indicating whether the terminal performs a measurement based on the second type of at least one of the measurement quantity or the frequency band; or
a third indication field, wherein the third indication field is used for instructing the terminal to perform at least one of: performing measurements based on the first type of at least one of the measurement quantity or the frequency band and the second type of at least one of the measurement quantity or the frequency band; performing measurements based on at least one of: the first type of at least one of the measurement quantity or the frequency band, or the second type of at least one of the measurement quantity or the frequency band; performing measurements based on a certain one of the first type of at least one of the measurement quantity or the frequency band and the second type of at least one of the measurement quantity or the frequency band; or not performing measurements based on the first type of at least one of the measurement quantity or the frequency band and the second type of at least one of the measurement quantity or the frequency band.

10. The method according to claim 9, wherein the granularity further is related to a reference signal; and
the reference signal comprises a first type and a second type, the first type of the reference signal comprises a channel state information-reference signal (CSI-RS), and the second type of the reference signal comprises a synchronization signal and physical broadcast channel block (SSB).

11. The method according to claim 10, wherein the second network indication message is used for instructing the terminal to report validity of a measurement result in a case that a first condition is satisfied; wherein
the first condition comprises one of following:
at least one of: a measurement result of the first type of the reference signal and at least one of the measurement quantity or the frequency band or a measurement result of the second type of the reference signal and at least one of the measurement quantity or the frequency band is valid;
both the measurement result of the first type of the reference signal and at least one of the measurement quantity or the frequency band and the measurement result of the second type of the reference signal and at least one of the measurement quantity or the frequency band are valid; and
a certain one of the measurement result of the first type of the reference signal and at least one of the measurement quantity or the frequency band and the measurement result of the second type of the reference signal and at least one of the measurement quantity or the frequency band is valid.

12. The method according to claim 10, further comprising: receiving a first uplink message, wherein the first uplink message comprises at least one of following:
at least one of: a measurement result of the first type of the reference signal and at least one of the measurement quantity or the frequency band or a measurement result of the second type of the reference signal and at least one of the measurement quantity or the frequency band is valid;
both the measurement result of the first type of the reference signal and at least one of the measurement quantity or the frequency band and the measurement result of the second type of the reference signal and at least one of the measurement quantity or the frequency band are valid; or a certain one of the measurement result of the first type of the reference signal and at least one of the measurement quantity or the frequency band and the measurement result of the second type of the reference signal and at least one of the measurement quantity or the frequency band is valid.

13. The method according to claim 10, wherein the third network indication message is used for instructing the terminal to perform at least one of:

reporting a measurement result of the first type of the reference signal and at least one of the measurement quantity or the frequency band and a measurement result of the second type of the reference signal and at least one of the measurement quantity or the frequency band;

reporting at least one of: the measurement result of the first type of the reference signal and at least one of the measurement quantity or the frequency band or the measurement result of the second type of the reference signal and at least one of the measurement quantity or the frequency band;

reporting a certain one of the measurement result of the first type of the reference signal and at least one of the measurement quantity or the frequency band or the measurement result of the second type of the reference signal and at least one of the measurement quantity or the frequency band; or not reporting the measurement result of the first type of the reference signal and at least one of the measurement quantity or the frequency band and the measurement result of the second type of the reference signal and at least one of the measurement quantity or the frequency band.

14. A terminal, comprising a processor, a memory, and a program or an instruction that is stored in the memory and executable on the processor, wherein the program or the instruction, when executed by the processor, causes the terminal to perform:

obtaining at least one of first information, second information, or third information; wherein the first information is related to a granularity of the terminal performing a non-connected state measurement; the second information is related to a granularity of the terminal reporting validity of a non-connected state measurement result; the third information is related to a granularity of the terminal reporting the non-connected state measurement result; and the granularity is related to at least one of a measurement quantity or a frequency band; wherein the measurement quantity comprises a first type and a second type, the first type of the measurement quantity comprises a received signal strength indication (RSSI), the second type of the measurement quantity comprises a channel occupancy ratio (COR), the frequency band comprises a first type and a second type, the first type of the frequency band comprises a licensed frequency band, and the second type of the frequency band comprises an unlicensed frequency band; and the first information is obtained from a received first network indication message, and the first network indication message comprises:

a first indication field and a second indication field, wherein the first indication field is used for indicating whether the terminal performs a measurement based on the first type of at least one of the measurement quantity or the frequency band; and the second indication field is used for indicating whether the terminal performs a measurement based on the second type of at least one of the measurement quantity or the frequency band; or a third indication field, wherein the third indication field is used for instructing the terminal to perform at least one of: performing measurements based on the first type of at least one of the measurement quantity or the frequency band and the second type of at least one of the measurement quantity or the frequency band; performing measurements based on at least one of: the first type of at least one of the measurement quantity or the frequency band, or the second type of at least one of the measurement quantity or the frequency band; performing measurements based on a certain one of the first type of at least one of the measurement quantity or the frequency band and the second type of at least one of the measurement quantity or the frequency band; or not performing measurements based on the first type of at least one of the measurement quantity or the frequency band and the second type of at least one of the measurement quantity or the frequency band.

15. The terminal according to claim 14, wherein the granularity further is related to a reference signal; and the reference signal comprises a first type and a second type, the first type of the reference signal comprises a channel state information-reference signal (CSI-RS), and the second type of the reference signal comprises a synchronization signal and physical broadcast channel block (SSB).

16. The terminal according to claim 15, wherein the second information is used for instructing the terminal to report validity of a measurement result in a case that a first condition is satisfied; wherein the first condition comprises one of following:

at least one of: a measurement result of the first type of the reference signal and at least one of the measurement quantity or the frequency band or a measurement result of the second type of the reference signal and at least one of the measurement quantity or the frequency band is valid;

both the measurement result of the first type of the reference signal and at least one of the measurement quantity or the frequency band and the measurement result of the second type of the reference signal and at least one of the measurement quantity or the frequency band are valid; and a certain one of the measurement result of the first type of the reference signal and at least one of the measurement quantity or the frequency band and the measurement result of the second type of the reference signal and at least one of the measurement quantity or the frequency band is valid;

or, the third information is used for instructing the terminal to perform at least one of following:

reporting a measurement result of the first type of the reference signal and at least one of the measurement quantity or the frequency band and a measurement result of the second type of the reference signal and at least one of the measurement quantity or the frequency band;

reporting at least one of: the measurement result of the first type of the reference signal and at least one of the measurement quantity or the frequency band or the measurement result of the second type of the reference signal and at least one of the measurement quantity or the frequency band;

reporting a certain one of the measurement result of the first type of the reference signal and at least one of the measurement quantity or the frequency band or the measurement result of the second type of the reference signal and at least one of the measurement quantity or the frequency band; or not reporting the measurement result of the first type of the reference signal and at least one of the measurement quantity or the frequency band and the measurement result of the second type of the reference signal and at least one of the measurement quantity or the frequency band.

17. The terminal according to claim 15, wherein the program or the instruction, when executed by the processor, causes the terminal to further perform:

after obtaining the second information, reporting fourth information, wherein the fourth information comprises at least one of following:

at least one of: a measurement result of the first type of the reference signal and at least one of the measurement quantity or the frequency band or a measurement result of the second type of the reference signal and at least one of the measurement quantity or the frequency band is valid;

both the measurement result of the first type of the reference signal and at least one of the measurement quantity or the frequency band and the measurement result of the second type of the reference signal and at least one of the measurement quantity or the frequency band are valid; or a certain one of the measurement result of the first type of the reference signal and at least one of the measurement quantity or the frequency band and the measurement result of the second type of the reference signal and at least one of the measurement quantity or the frequency band is valid.

18. The terminal according to claim 16, wherein the first condition is obtained from a received second network indication message, the second network indication message comprises a fourth indication field, and the fourth indication field comprises at least one of following:

a fifth value, wherein the fifth value is used for instructing the terminal to report validity of a measurement result in a case that at least one of: the measurement result of the first type of the reference signal and at least one of the measurement quantity or the frequency band or the measurement result of the second type of the reference signal and at least one of the measurement quantity or the frequency band is valid;

a sixth value, wherein the sixth value is used for instructing the terminal to report validity of a measurement result in a case that both the measurement result of the first type of the reference signal and at least one of the measurement quantity or the frequency band and the measurement result of the second type of the reference signal and at least one of the measurement quantity or the frequency band are valid;

a seventh value, wherein the seventh value is used for instructing the terminal to report validity of a measurement result in a case that the measurement result of the first type of the reference signal and at least one of the measurement quantity or the frequency band is valid; and an eighth value, wherein the eighth value is used for instructing the terminal to report validity of a measurement result in a case that the measurement result of the second type of the reference signal and at least one of the measurement quantity or the frequency band is valid.

19. The terminal according to claim 17, wherein the fourth information is carried in a first uplink message, and the first uplink message comprises:

a fifth indication field and a sixth indication field, wherein the fifth indication field is used for indicating whether the measurement result of the first type of the reference signal and at least one of the measurement quantity or the frequency band is valid; and the sixth indication field is used for indicating whether the measurement result of the second type of the reference signal and at least one of the measurement quantity or the frequency band is valid; or a seventh indication field, wherein the seventh indication field is used for indicating at least one of following: both the measurement result of the first type of the reference signal and at least one of the measurement quantity or the frequency band and the measurement result of the second type of the reference signal and at least one of the measurement quantity or the frequency band are valid; at least one of: the measurement result of the first type of the reference signal and at least one of the measurement quantity or the frequency band or the measurement result of the second type of the reference signal and at least one of the measurement quantity or the frequency band is valid; or a certain one of the measurement result of the first type of the reference signal and at least one of the measurement quantity or the frequency band and the measurement result of the second type of the reference signal and at least one of the measurement quantity or the frequency band is valid.

20. The terminal according to claim 16, wherein the third information is obtained from a received third network indication message, and the third network indication message comprises:

an eighth indication field and a ninth indication field, wherein the eighth indication field is used for indicating whether the terminal reports the measurement result of the first type of the reference signal and at least one of the measurement quantity or the frequency band; and the ninth indication field is used for indicating whether the terminal reports the measurement result of the second type of the reference signal and at least one of the measurement quantity or the frequency band; or a tenth indication field, wherein the tenth indication field is used for instructing the terminal to perform at least one of: reporting the measurement result of the first type of the reference signal and at least one of the measurement quantity or the frequency band or the measurement result of the second type of the reference signal and at least one of the measurement quantity or the frequency band; reporting at least one of: the measurement result of the first type of the reference signal and at least one of the measurement quantity or the frequency band or the measurement result of the second type of the reference signal and at least one of the measurement quantity or the frequency band; reporting a certain one of the measurement result of the first type of the reference signal and at least one of the measurement quantity or the frequency band and the measurement result of the second type of the reference signal and at least one of the measurement quantity or the frequency band; and not reporting the measurement result of the first type of the reference signal and at least one of the measurement quantity or the frequency band and the measurement result of the second type of the reference signal and at least one of the measurement quantity or the frequency band.

* * * * *